United States Patent [19]

Shinoda et al.

[11] Patent Number: 4,810,477

[45] Date of Patent: Mar. 7, 1989

[54] METHOD FOR DESULFURIZING SMOKE

[75] Inventors: Naoharu Shinoda; Atsushi Tatani; Toru Takashina; Masakazu Onizuka, all of Hiroshima, Japan

[73] Assignee: Mitsubishi Jukogyo Kabushiki Kaisha, Tokyo, Japan

[21] Appl. No.: 95,831

[22] Filed: Sep. 14, 1987

[30] Foreign Application Priority Data

Sep. 16, 1986 [JP] Japan ................... 61-216025

[51] Int. Cl.$^4$ ............................................. C01B 17/00
[52] U.S. Cl. ....................................... 423/242; 423/555
[58] Field of Search ............... 423/242 A, 242 R, 555, 423/244 A, 244 R

[56] References Cited

U.S. PATENT DOCUMENTS 3,681,009 8/1972 Horsley .......................... 423/244
4,487,784 12/1984 Kuroda et al. .................. 423/555

Primary Examiner—Gregory A. Heller
Attorney, Agent, or Firm—Birch, Stewart, Kolasch & Birch

[57] ABSTRACT

The present invention is concerned with a method for desulfurizing smoke which includes an absorbing procedure of cleaning a combustion exhaust gas with a limestone slurry; an oxidizing procedure of blowing air into the slurry coming from the absorbing process to oxidize calcium sulfite in the slurry to gypsum; a circulating process of circulating, through the absorbing procedure, the slurry coming from the oxidizing procedure; and a separating procedure of drawing a part of the slurry from the circulating procedure, separating and recovering gypsum therefrom, and returning the remaining slurry to the circulating system. The method is characterized in that a separator for separating the fed slurry into an over flow and an under flow is used, and the fed slurry is irradiated with ultrasonic waves to accelerate the separation of gypsum particles from limestone particles, whereby the limestone particles and the gypsum particles are transferred to the over flow and the under flow, respectively.

23 Claims, 3 Drawing Sheets

METHOD FOR DESULFURIZING SMOKE

FIELD OF THE INVENTION AND BACKGROUND OF THE INVENTION

The present invention relates to a method for desulfurizing smoke in which a combustion exhaust gas is cleaned by the use of an absorbing slurry containing limestone particles suspended therein. In particular, the invention relates to a method for desulfurizing smoke by first separating an absorbing slurry, which has absorbed $SO_2$, into a gypsum slurry and a limestone slurry, returning the limestone slurry to an absorbing process, and recovering gypsum from the gypsum slurry.

FIG. 3 attached hereto shows a schematic view of an apparatus for carrying out a conventional method for desulfurizing smoke.

In FIG. 3, a combustion exhaust gas 202 is cleaned in an absorbing tower 201 of a smoke-desulfurizing apparatus. In an absorbing tower tank 203, an absorbing slurry is stored in which calcium sulfite particles, gypsum particles and limestone particles are suspended. A sulfurous acid gas $SO_2$ present in the exhaust gas is absorbed in the absorbing slurry by spraying the absorbing slurry from the absorbing tower tank 203 through a spray pipe 205 with the aid of an absorbing tower circulating pump 204. The absorbing slurry sprayed in the exhaust gas becomes a mist state and is then entrained by the exhaust gas. The mist is afterward removed from the exhaust gas by means of a mist eliminator 206 and is then discharged as a cleaned gas 207 from the system. In this mist eliminator 206, the gypsum particles are liable to adhere thereto and to clog it eventually, and thus the mist eliminator 206 is washed by spraying water through a washing nozzle 208.

On the other hand, a limestone slurry which is an absorbing agent is fed to the absorbing tower tank 203 through a limestone feed pipe 209 and is then reacted with $SO_2$ absorbed in the absorbing slurry to produce calcium sulfite. In this case, the thus produced calcium sulfite is partially oxidized by oxygen contained in the exhaust gas, thereby converting calcium sulfite into gypsum. Further, in order to heighten $SO_2$ absorbing power of the absorbing slurry, limestone may be fed thereto through the feed pipe 209 in an amount in excess of a level necessary to absorb $SO_2$. As a consequence, at this point in time, the absorbing slurry stored in the absorbing tower tank 203 is composed of a mixture of the calcium sulfite particles, the gypsum particles, and the limestone particles.

To recover gypsum as a by-product, as described in Japanese Utility Model Provisional Publication No. 10833/1984, the absorbing slurry is drawn out through a valve 211 and is led to a separator 212, in which the absorbing slurry is separated into a gypsum slurry 213 and a mixed slurry 214 containing calcium sulfite and limestone, and the mixed slurry 214 containing calcium sulfite and limestone is then returned to the absorbing tower tank 203 and the gypsum slurry 213 is delivered to a by-product gypsum separator (not shown) via a gypsum slurry tank 215. However, even when the absorbing slurry is separated into the gypsum slurry 213 and the mixed slurry 214 containing calcium sulfite and limestone by means of a centrifugal separator such as a hydrocyclone and a weight sedimentation separator such as a thickener, the result of this separation is insufficient. Accordingly, in the conventional technique, the by-product gypsum is contaminated with calcium sulfite particles and limestone particles, and for this reason, high-purity gypsum cannot be recovered.

The inventors of the present application have investigated the cause of such contamination, and finally it has been found that the ground limestone particles having an average diameter of 10 $\mu$m and the calcium sulfite particles having an average diameter of 10 $\mu$m which have been produced due to the $SO_2$ absorbing reaction tend to coagulate in the absorbing slurry, and the coagulated calcium sulfite particles and limestone particles embrace the gypsum particles therein having an average diameter of 40 $\mu$m, which fact makes their separation difficult.

In addition, another process for desulfurizing smoke is suggested in Japanese Patent Provision Publication No. 61070/1979. In this process, an absorbing slurry is irradiated with ultrasonic waves to precipitate $CaSO_4$ which has been dissolved in a supersaturating state in the absorbing slurry, and the precipitated $CaSO_4$ is then separated and recovered by a thickener. The aqueous alkali solution from which the precipitate has been removed is supplied with $Ca(OH)_2$ and is then circulated through a desulfurizing tower.

OBJECT AND SUMMARY OF THE INVENTION

The present invention provides a method for desulfurizing smoke by which the drawbacks of conventional smoke-desulfurizing methods are overcome, that is, by which coagulated particles in an absorbing slurry are broken up to accelerate the separation of gypsum particles and to thereby recover high-quality gypsum.

The present invention is directed to a method for desulfurizing smoke which comprises an absorbing process of cleaning a combustion exhaust gas with a limestone slurry; an oxidizing process of blowing air into the slurry coming from the absorbing process to oxidize calcium sulfite in the slurry to gypsum; and a circulating process of circulating, through the absorbing process, the slurry coming from the oxidizing process; and a separating process of drawing a part of the slurry from the circulating process, separating and recovering gypsum therefrom, and returning the remaining slurry to the circulating system. The aforesaid method is characterized in that a separator for separating the fed slurry into an over flow and an under flow is used, and the fed slurry is irradiated with ultrasonic waves to accelerate the separation of gypsum particles from limestone particles, whereby the limestone particles and the gypsum particles are transferred to the over flow and the under flow, respectively.

DETAILED DESCRIPTION OF PREFERRED EMBODIMENTS

Figure 1:
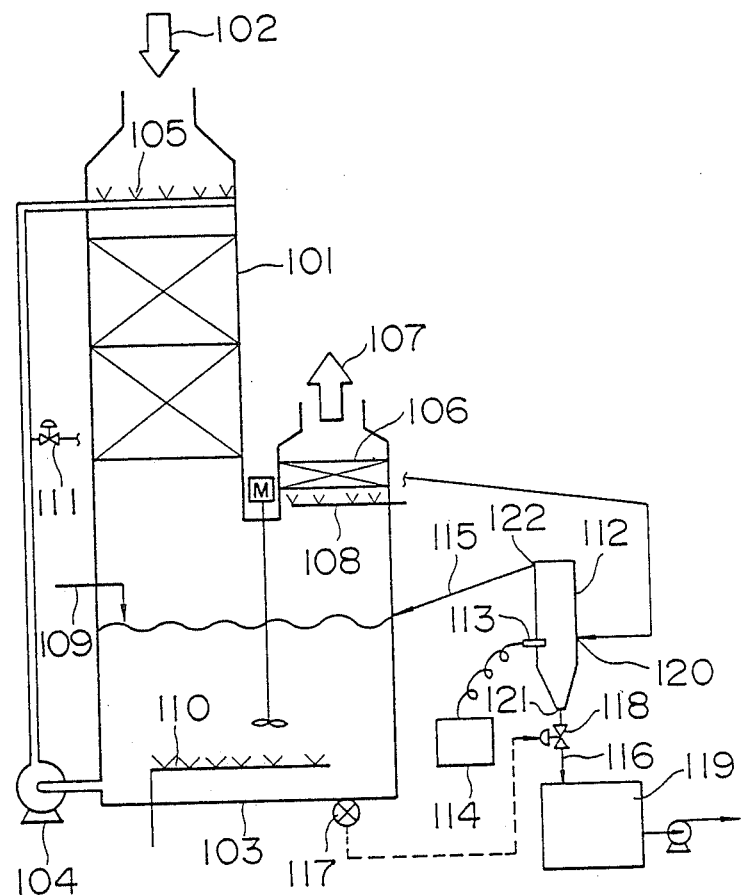
FIG. 1 is a perspective view of a smoke-desulfurizing apparatus for carrying out a method of the present invention.

The function of the present invention will be described in detail with reference to FIG. 1.

An absorbing slurry in which gypsum particles and limestone particles are suspended is stored in an absorbing tower tank 103. This absorbing slurry is sprayed into an absorbing tower 101 through a spray pipe 105 by means of an absorbing tower circulating pump 104.

A combustion exhaust gas 102 in the absorbing tower 101 is cleaned by the sprayed absorbing slurry, and at this time, $SO_2$ present in the exhaust gas is absorbed in the absorbing slurry.

The absorbing slurry which has been sprayed into the exhaust gas becomes a mist state and is then entrained by the exhaust gas, and the mist is afterward removed from the exhaust gas in a mist eliminator 106 and is then discharged as a cleaned gas 107 from the system. In this mist eliminator 106, the gypsum particles are liable to adhere thereto and to clog it eventually, and thus the mist eliminator 106 is washed by spraying water through a washing nozzle 108.

On the other hand, a limestone slurry which is an absorbing agent is fed to the absorbing tower tank 103 through a limestone feed pipe 109 and is then reacted with $SO_2$ absorbed in the absorbing slurry to produce calcium sulfite. This calcium sulfite is oxidized by oxygen blown from an air sparger 110 disposed in the absorbing tank 103, thereby converting all of the calcium sulfite into gypsum. As a consequence, the absorbing slurry stored in the absorbing tower tank 103 can be treated so as to be free from calcium sulfite particles.

To enhance the $SO_2$-absorbing power of the absorbing slurry, limestone may be fed thereto through the feed pipe 109 in an amount in excess of a level necessary to absorb $SO_2$. Therefore, the absorbing slurry stored in the absorbing tower tank 103 is composed of a mixed slurry of the gypsum particles and the limestone particles.

A part of the absorbing slurry is led to a separator 112 through a valve 111. The separator 112 is provided with, for example as shown in FIG. 1, a slurry feed inlet 120, an outlet 121 for an under flow and an outlet 122 for an over flow, and is constructed so that a feed rate of the slurry coming through the feed inlet 120 and a discharge rate going out through the outlet 121 may be adjusted so as to form the over flow streaming upward from the feed inlet 120 and the under flow streaming downward therefrom.

An ultrasonic wave oscillator 113 is preferably disposed in the vicinity of a diverging point of the over flow and the under flow. Element 114 represents an ultrasonic wave transmitter.

The ultrasonic wave oscillator 113 provides ultrasonic wave vibrations to the absorbing slurry fed to the separator 112 to break up and disperse the coagulated limestone particles.

The absorbing slurry contains the limestone particles having a diameter of about 10 $\mu$m and the gypsum particles having a diameter of about 40 $\mu$m and the limestone particles are coagulated embracing the gypsum particles, but since the oscillator 113 breaks up and disperses the coagulated limestone particles, some difference arises between the sedimentation rates of the gypsum particles and the limestone particles, so that both the particles are easily separable.

The thus separated limestone particles are transferred to the side of the over flow and the gypsum particles are transferred to the side of the under flow. As a result, the limestone slurry 115 and the gypsum slurry 116 are obtained separately.

The amount of the gypsum slurry 116 which should be drawn from the separator 112 can be adjusted by opening and closing a valve 118 in response to a signal from a slurry concentration detector 117 (a pycnometer) for the absorbing slurry which is equipped in the absorbing tower tank 103. The concentration of the gypsum particles in the absorbing may serve as an advocate for the prevention of scale.

The gypsum slurry 116 is delivered to a by-product gypsum separator (not shown) via a gypsum slurry tank 119. Further, the limestone slurry 115 which overflows the separator 112 is returned to the absorbing tower tank 103 and is then utilized again for the absorption of $SO_2$.

Next, reference will be made to the separation effect of the gypsum particles from the limestone particles by means of the ultrasonic wave vibration.

The absorbing slurry containing about 100 grams of the gypsum particles per kilogram of $H_2O$ and about 15 grams of the limestone particles per kilogram of $H_2O$ was fed to the separator, an average diameter of each gypsum particle being 40 $\mu$m, an average diameter of each limestone particle being 10 $\mu$m. In this case, the feed flow rate of the absorbing slurry to the separator was adjusted all the time so that liquid flow rates of the over and under flows might be substantially equal to each other.

Changing the feed flow rate of the slurry to the separator causes the flow rate of the over flow to vary (the flow rate of the under flow was also changed so as to become substantially equal to the flow rate of the over flow).

Therefore, the change in the feed flow rate of the slurry to the separator can be understood as the change in an average rise velocity of the over flow liquid in the separator.

Figure 2:
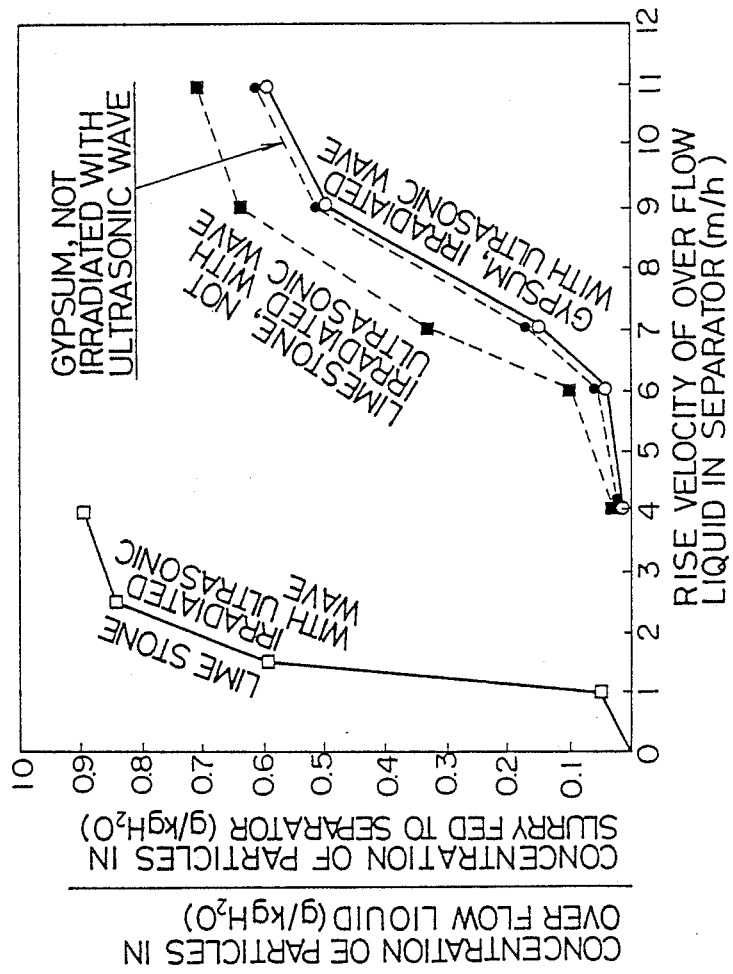
FIG. 2 is a graph illustrating the effects of ultrasonic wave irradiation in the present invention.
Figure 3:
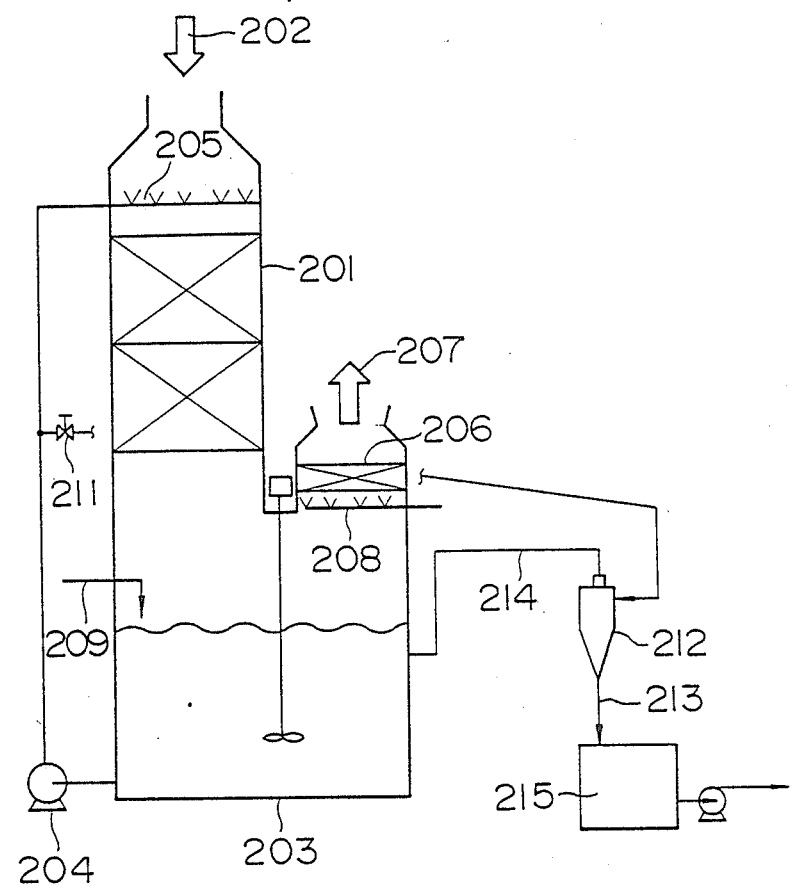
FIG. 3 is a schematic view of a conventional smoke-desulfurizing apparatus.

In case the slurry was not irradiated with any ultrasonic waves, the limestone particles were coagulated and they behaved like the gypsum particles, as illustrated by dotted lines having black symbols in FIG. 2. In addition, when a rise in the velocity of the over flow liquid was 4 m/h or less, this liquid was in a clarifying state. As is apparent from FIG. 2, the limestone particles and the gypsum particles had substantially equal sedimentation rates, and therefore the respective particles were hard to separate from each other.

However, when the slurry was irradiated with ultrasonic wave, the limestone particles became easily separable from the gypsum particles, as illustrated by solid lines having white symbols in FIG. 2. The data in FIG. 2 were obtained by irradiating the slurry in the 10-liter separator with ultrasonic wave having an output of 400 W and a frequency of 28 KHz.

According to the present invention in which the above-mentioned construction is employed, limestone-free and calcium sulfite-free gypsum can be recovered, and the absorbing slurry from which gypsum has been removed can be returned to the exhaust gas-cleaning system to thereby increase the absorbing power of the absorbing agent.

What is claimed is:

1. A method for removing sulfur dioxide from an exhaust gas, which comprises the steps of:
   contacting said exhaust gas with a first slurry containing gypsum and limestone so as to allow said first slurry to absorb sulfur dioxide containing components of said exhaust gas;
   introducing oxygen into said first slurry to oxidize calcium sulfite to gypsum, said calcium sulfite being produced by a reaction between absorbed sulfur dioxide containing components and said limestone;

withdrawing a portion of said first slurry to a separator;

irradiating said portion of said first slurry which has been withdrawn to said separator with ultrasonic waves so as to form a limestone slurry and a gypsum slurry;

returning limestone slurry from said separator to said first slurry;

withdrawing said gypsum slurry from said separator; and withdrawing purified exhaust gas.

2. The method of claim 1, which is conducted continuously.

3. The method of claim 1, wherein said exhaust gas is contacted with said first slurry by spraying said first slurry into said exhaust gas.

4. the method of claim 3, wherein said exhaust gas entrains a portion of said first slurry after contact therewith.

5. The method of claim 1, further comprising feeding limestone to said first slurry in an amount exceeding that necessary to absorb the sulfur-containing components of said exhaust gas.

6. The method of claim 1, wherein said separator has an inlet for receiving said portion of said first slurry, a first outlet for withdrawing said limestone slurry, and a second outlet for withdrawing said gypsum slurry.

7. The method of claim 6, wherein an ultrasonic wave oscillator irradiates said portion of said first slurry which has been withdrawn to said separator.

8. The method of claim 7, wherein said ultrasonic wave oscillator is located near the diverging point of said first outlet and said second outlet of said separator.

9. The method of claim 1, wherein said first slurry contains gypsum particles having a diameter of about 40 $\mu$m and limestone particles having a diameter of about 10 $\mu$m.

10. The method of claim 1, further comprising introducing said gypsum slurry which has been withdrawn from said separator into a gypsum separator and withdrawing gypsum particles thereform.

11. A method for removing sulfur dioxide from an exhaust gas, which comprises the steps of:

introducing said exhaust gas into a vessel having a first slurry containing gypsum and limestone so as to allow said first slurry to absorb sulfur dioxide containing components of said exhaust gas;

introducing oxygen into said first slurry to oxidize calcium sulfite to gypsum, said calcium sulfite being produced by a reaction between absorbed sulfur dioxide containing components and said limestone;

withdrawing a portion of said first slurry from said vessel and introducing it into a separator;

irradiating said portion of said first slurry which has been withdrawn to said separator with ultrasonic waves to form a limestone slurry and a gypsum slurry;

withdrawing said limestone slurry from said separator and returning it to said first slurry in said vessel;

withdrawing said gypsum slurry from said separator; and withdrawing purified exhaust gas from said vessel.

12. The method of claim 11, which is conducted continuously.

13. The method of claim 11, wherein said exhaust gas is contacted with said first slurry by spraying said first slurry into said exhaust gas.

14. The method of claim 13, wherein said exhaust gas entrains said first slurry after contact therewith.

15. The method of claim 11, further comprising introducing limestone into said vessel in an amount exceeding that necessary to absorb the sulfur dioxide containing components of said exhaust gas.

16. The method of claim 11, wherein said separator has an inlet for receiving said portion of said first slurry being withdrawn from said vessel, a first outlet for withdrawing said limestone slurry, and a second outlet for withdrawing said gypsum slurry.

17. The method of claim 16, wherein an ultrasonic wave oscillator irradiates said portion of said first slurry which has been withdrawn to said separator.

18. The method of claim 17, wherein said ultrasonic wave oscillator is located near the diverging point of said first outlet and said second outlet of said separator.

19. The method of claim 11, wherein said first slurry contains gypsum particles having a diameter of about 40 $\mu$m and limestone particles having a diameter of about 10 $\mu$m.

20. The method of claim 11, further comprising introducing said gypsum slurry which has been withdrawn from said separator into a gypsum separator and withdrawing gypsum particles thereform.

21. The method of claim 14, wherein said exhaust gas is separated from said first slurry by contact with a mist eliminator prior to being withdrawn from said vessel.

22. The method of claim 11, wherein the amount of said gypsum slurry withdrawn from said separator is dependent upon the concentration of said first slurry in said vessel.

23. The method of claim 11, wherein said portion of said first slurry introduced into said separator contains about 100 grams of gypsum and about 15 grams of limestone per kilogram of $H_2O$.

* * * * *